Patented Feb. 27, 1951

2,543,580

UNITED STATES PATENT OFFICE 2,543,580

SOIL FUMIGANT CAPSULE

Wallace G. Kay, Grosse Pointe Park, Mich.

No Drawing. Application December 16, 1946,
Serial No. 716,675

1 Claim. (Cl. 167—39)

The present invention relates to a method of and apparatus for soil fumigating.

Considerable development work has been done recently with the use of fumigants which are deposited in soil for the purpose of killing insects and larvae of the same, and especially wireworms and nematodes. In addition to killing harmful insects, the use of the fumigant has been found to improve plant growth. It is also useful in controlling certain soil pathogens. At the present time fumigants employed are introduced into the soil by means of a so-called gun which contains a tubular nozzle adapted to be forced into the soil to a predetermined depth, after which fumigant in either liquid or vapor phase is forced into the soil.

A number of fumigants have been suggested and very satisfactory results have been obtained with several different kinds. For purposes of illustration, however, two of the most effective fumigants employed are 1,2-dichloropropane and 1,3-dichloropropene, and ethylene dibromide. These fumigants are supplied in the form of solutions or mixtures employing a volatile hydrocarbon as a carrier, such for example as naphtha. If desired, ammonia may be included, and will perform a very effective local fertilization by reason of its nitrogen content. Great care has to be exercised in their use, inasmuch as noxious or dangerous fumes are produced. In fact, it has been a common practice in the past for the user to protect himself by wearing a gas mask.

While certain implements have been provided which render the use of the gas mask unnecessary, nevertheless there has been no simple manner in which the fumigant could be placed in the soil by what is essentially a hand operation which does not result in either risk to the operator or considerable inconvenience due to the necessity of providing for protection against fumes produced.

According to the present invention a liquid fumigant is placed in capsules subject to fracture, rupture or disintegration under the ground. These capsules are then placed at a desired depth under the soil and are left. No risk is entailed, since the capsules retain the fumigant until the operator has left the scene.

At some later time, which may vary considerably in accordance with ground and/or weather conditions, the capsules rupture or dissolve to the extent that the liquid fumigant contained therein is released. At this time the liquid fumigant vaporizes and penetrates the soil to a considerable distance surrounding the point of deposit of the capsule.

It is an object of the present invention to provide a new method of fumigating soil which comprises depositing in the soil protective capsules containing a definitely predetermined amount of fumigant, which capsules are adapted to rupture or fracture so as to effect a gradual release of the fumigant at the point of deposit.

It is a further object of the present invention to provide soil fumigant in the form of gelatinous capsules containing the fumigant in liquid phase.

The exact size of the capsule will depend upon the nature of the fumigant and the nature of the soil for which it is intended. By way of example, it is found that capsules containing 3 cc. of fumigant, either 1,2-dichloropropane and 1,3-dichloropropene or ethylene dibromide, are quite satisfactory. The capsules themselves are ordinary gelatinous capsules which may be formed, filled and sealed on conventional automatic machinery. These capsules comprise two half shells sealed together along a central seam.

In carrying out the method of the present invention, it is necessary only to provide a hole in the ground in which the capsule may be dropped. This may conveniently be done by forcing a stick or other suitable implement into the ground for a depth of 6 or 8 inches, dropping the capsule therein and closing the hole by filling loose earth into it or by causing its walls to collapse by stepping on them.

The present method of application provides for a very exact placement of the fumigant where desired, as for example along rows to be planted or adjacent groups of plants in the field. It thus affords means for effecting a very considerable saving in the amount of relatively expensive fumigant employed. At the same time it completely avoids any danger to the user, inasmuch as the capsules are completely impervious to the fumigant and may be safely handled.

Capsules of the type referred to may be made from a gelatin base, and include other ingredients, such for example as glycerine as a softener or plasticizer. They are ordinarily produced in halves which are then joined together to form an enclosure having a seam. When placed in the ground, the capsules first swell, and then after a period they fracture or rupture along a seam. The action is such that a gradual release of the fumigant results. This permits the most efficient use of the fumigant, and permits equivalent results to be achieved with a minimum of the relatively expensive fumigant. Upon release of the fumigant, it permeates the soil for a substantial distance both below and at the sides of the capsule, as well as above it.

Where the terms "fracture or rupture" are used herein and in the claim, the expression will be understood to define the opening up of the capsule as described to release the fumigant therefrom, and preferably in a gradual manner.

One of the important advantages which follows the use of fumigant in the capsules as outlined above is that it makes possible the use of the fumigants at full strength. In accordance with prior practice the fumigants referred to have been employed in relatively dilute solutions. When, however, the fumigants are employed with capsules they may be used in pure form or at least in relatively concentrated solutions. This effects economy in the use of the fumigant, since the expense of the diluent is avoided. In addition, the pure or concentrated fumigant is more effective and the amount of fumigant required to fumigate a given area is less than when the relatively dilute solution is employed.

The specific fumigants referred to by way of example above do not have an adverse action on the material of the capsules. However, it is contemplated that in certain instances a fumigant might be employed which would have a deleterious action on unmodified gelatinous capsules, and it is within the purview of the present invention to modify the material of the capsules as may be indicated to render them impervious to the fumigant contained therein while at the same time retaining their property of effecting gradual release of the fumigant after being placed in the ground.

Reference was made above to the accuracy of control in the amount of fumigant placed in the soil which is made possible by the use of the capsules disclosed herein. The fumigant is relatively expensive and inaccurate control in the amount deposited results in greatly increased cost and may result in irregular dosage. One of the prior methods of depositing relatively accurately controlled amounts at spaced intervals in the soil involved the insertion in the soil of a pipe, after which a measured amount of the liquid fumigant was poured into the pipe and allowed to drain into the soil. In order to carry out this method for commercial fumigation of soil it was necessary to employ a relatively large number of pipes, and it will be appreciated that the method was both awkward and expensive as compared to the relatively simple method which results from the use of the present capsules.

In employing capsules of the type disclosed herein the ground is first preferably prepared for planting and is rendered friable for best results. Ordinarily fumigation of the soil is performed before planting takes place, at which time the soil is apt to be both moist and warm.

It will be understood that the length of time required for the capsules to rupture or fracture so as to release the fumigant depends upon a great many factors, such for example as temperature of the soil, moisture content of the soil, physical condition of the soil and possibly chemical characteristics thereof. Accordingly, there may be quite a variation in the length of time which elapses before the capsule fractures or ruptures. Depending upon extreme conditions, this interval may be from a few hours to a few days. At all events, capsules are deposited in the soil sufficiently in advance of the contemplated time of planting to enable the fumigation to be complete and the soil substantially rid of fumigant at the time planting takes place. In practice it is desirable to defer planting as long as a definite odor of the fumigant remains in the soil.

Briefly reviewed, the use of capsuled fumigant has several specific advantages over prior usages. In the first place, a very accurate control may be exercised over the amount of fumigant used. Also, great accuracy in the placement of the fumigant is possible. The use of fumigant in pure or concentrated state is made possible. All danger of injury to the user is avoided, since fumigant is not released for a substantial period after placement. Finally, release of the fumigant is gradual, thus increasing its effectiveness and permitting the use of less of the material to produce the same results.

The capsules are relatively inexpensive and they may be used in large scale truck farming, or they are equally useful in greenhouses, potted plants, or the like.

What I claim as my invention is:

A new article of manufacture comprising a volatile fumigant entirely in liquid state, said fumigant being substantially pure ethylene dibromide, said fumigant being contained in a one-piece sealed rupturable gelatin capsule having a shell effective to resist vapor pressure of the fumigant until placed in contact with soil or other moist medium for a period of not less than a few hours and thereafter to rupture and permit the escape of the fumigant therefrom.

WALLACE G. KAY.

REFERENCES CITED

The following references are of record in the file of this patent:

UNITED STATES PATENTS

| Number | Name | Date |
| --- | --- | --- |
| 1,971,390 | Van Yahres | Aug. 28, 1934 |
| 2,091,933 | Jones | Sept. 7, 1937 |
| 2,199,425 | Waring | May 7, 1940 |
| 2,219,578 | Pittenger | Oct. 29, 1940 |
| 2,336,270 | Lynn | Dec. 7, 1943 |

FOREIGN PATENTS

| Number | Country | Date |
| --- | --- | --- |
| 13,221 | Great Britain | of 1890 |
| 82,739 | Sweden | Feb. 26, 1935 |
| 483,066 | Germany | Dec. 15, 1930 |
| 703,190 | Germany | Mar. 3, 1941 |

OTHER REFERENCES

Lange, Jr.: J. Econ. Ent., vol. 38, No. 6, Dec. 1945, pp. 643–645.